(12) United States Patent
Chen et al.

(10) Patent No.: US 11,796,843 B2
(45) Date of Patent: Oct. 24, 2023

(54) VIEWING ANGLE CONTROL DEVICE AND DISPLAY APPARATUS

(71) Applicant: Coretronic Corporation, Hsin-Chu (TW)

(72) Inventors: Ping-Yen Chen, Hsin-Chu (TW); Chung-Yang Fang, Hsin-Chu (TW); Wen-Chun Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 39 days.

(21) Appl. No.: 16/994,672

(22) Filed: Aug. 17, 2020

(65) Prior Publication Data

US 2021/0055582 A1 Feb. 25, 2021

Related U.S. Application Data

(60) Provisional application No. 62/889,025, filed on Aug. 19, 2019.

(30) Foreign Application Priority Data

May 15, 2020 (CN) .......................... 202010410754.X

(51) Int. Cl.
*G02F 1/13* (2006.01)
*G02F 1/1335* (2006.01)

(52) U.S. Cl.
CPC ...... *G02F 1/1323* (2013.01); *G02F 1/133528* (2013.01); *G02F 1/133538* (2021.01)

(58) Field of Classification Search
CPC ............................................... G09G 2320/068
See application file for complete search history.

(56) References Cited

U.S. PATENT DOCUMENTS

2004/0004681 A1* 1/2004 Ozawa ................ G02F 1/13363
349/61
2004/0233350 A1* 11/2004 Kawanishi ........ G02F 1/133504
349/96

(Continued)

FOREIGN PATENT DOCUMENTS

CN       1448764       10/2003
CN       1755460        4/2006

(Continued)

OTHER PUBLICATIONS

"Office Action of Taiwan Counterpart Application", dated May 10, 2021, p. 1-p. 3.

(Continued)

*Primary Examiner* — Nan-Ying Yang
(74) *Attorney, Agent, or Firm* — JCIPRNET

(57) ABSTRACT

A viewing angle control device including a plurality of first polarizing portions and a plurality of transmissive portions is provided. The first polarizing portions are arranged along a first direction and extended in a second direction. The transmissive portions and the first polarizing portions are alternately arranged. Each of the first polarizing portions has a width in the first direction and a height in a direction perpendicular to the first direction and the second direction. A ratio of the height to the width of the first polarizing portion is greater than 1. A display apparatus adopting the viewing angle control device is also provided. The viewing angle control device and the display apparatus provided herein have a filter effect at a large viewing angle, improved light transmittance in the viewing angle direction, and excellent anti-peeping performance.

9 Claims, 14 Drawing Sheets

(56) References Cited

U.S. PATENT DOCUMENTS

| | | | | |
|---|---|---|---|---|
| 2012/0169910 A1* | 7/2012 | Singh | ............... | H04N 5/349 |
| | | | | 348/E5.091 |
| 2014/0110040 A1* | 4/2014 | Cok | ............... | G02B 5/3058 |
| | | | | 156/182 |
| 2015/0009563 A1* | 1/2015 | Lauters | ............... | G02B 5/003 |
| | | | | 359/485.03 |
| 2020/0355960 A1* | 11/2020 | Mitobe | ............. | G02F 1/133528 |

FOREIGN PATENT DOCUMENTS

| | | |
|---|---|---|
| CN | 105572959 | 5/2016 |
| CN | 207301541 | 5/2018 |
| CN | 108196391 | 6/2018 |
| TW | M563556 | 7/2018 |
| WO | 2019151334 | 8/2019 |

OTHER PUBLICATIONS

"Office Action of China Counterpart Application", dated Oct. 8, 2022, p. 1-p. 10.
"Office Action of China Counterpart Application", dated Jun. 17, 2023, p. 1-p. 11.

\* cited by examiner

VIEWING ANGLE CONTROL DEVICE AND DISPLAY APPARATUS

CROSS-REFERENCE TO RELATED APPLICATION

This application claims the priority benefits of U.S. provisional application Ser. No. 62/889,025, filed on Aug. 19, 2019, and China application serial no. 202010410754.X, filed on May 15, 2020. The entirety of each of the above-mentioned patent applications is hereby incorporated by reference herein.

BACKGROUND

Technical Field

The disclosure relates to a viewing angle control technique, and particularly relates to a viewing angle control device and a display apparatus.

Description of Related Art

To allow multiple viewers to watch together, a display apparatus is generally provided with a wide viewing angle display effect. However, in certain situations or occasions, such as browsing private website pages, viewing confidential information, or entering passwords in a public, the wide viewing angle display effect is easy to cause the confidential information to be peeped by others and lead to leakage of the confidential information. To achieve the anti-peeping effect, the general approach is to place a light control film (LCF) in front of the display panel to filter out the light at a large angle. Conversely, when peeping prevention is not required, the light control film is manually removed from the front of the display panel. In other words, although such a light control film achieves the anti-peeping effect, there is still room for improvement in terms of its operational convenience. Therefore, how to develop a display apparatus providing convenient viewing angle switching and excellent anti-peeping effect has become an issue for relevant manufacturers.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure were acknowledged by a person of ordinary skill in the art.

SUMMARY

The disclosure provides a viewing angle control device which has a filter effect at a large viewing angle and has improved light transmittance in the viewing angle direction.

The disclosure provides a display apparatus having excellent anti-peeping performance.

Other objectives and advantages of the disclosure may be further understood from the technical features disclosed herein.

In order to achieve one, some, or all of the above-mentioned objectives or other objectives, an embodiment of the disclosure provides a viewing angle control device. The viewing angle control device includes a plurality of first polarizing portions and a plurality of transmissive portions. The first polarizing portions are arranged along a first direction and extend in a second direction. The transmissive portions and the first polarizing portions are alternately arranged. Each of the first polarizing portions has a width in the first direction and a height in a direction perpendicular to the first direction and the second direction, and a ratio of the height to the width of each of the first polarizing portions is greater than 1.

In order to achieve one, some, or all of the above-mentioned objectives or other objectives, an embodiment of the disclosure provides a display apparatus. The display apparatus includes a viewing angle control device and a display panel. The viewing angle control device includes a plurality of first polarizing portions and a plurality of transmissive portions. The first polarizing portions are arranged along a first direction and extend in a second direction. The transmissive portions and the first polarizing portions are alternately arranged. Each of the first polarizing portions has a width in the first direction and a height in a direction perpendicular to the first direction and the second direction, and a ratio of the height to the width of each of the first polarizing portions is greater than 1. The display panel overlaps the viewing angle control device. The display panel is provided with a polarizer on one side facing the viewing angle control device. The first polarizing portions have a first transmission axis, the polarizer has a second transmission axis, and the first transmission axis is perpendicular to the second transmission axis.

Based on the above, in the viewing angle control device according to an embodiment of the disclosure, through the alternating arrangement of the polarizing portion and the transmissive portion, and an aspect ratio greater than 1 of the polarizing portion, the polarizability of light at a large viewing angle can be increased, and the light energy loss after the light passes through the viewing angle control device can be effectively reduced. In addition, in the display apparatus according to an embodiment of the disclosure, by configuring the transmission axis of the polarizer provided between the display panel and the viewing angle control device of the above embodiment to be perpendicular to the transmission axis of the polarizing portion of the viewing angle control device, the display apparatus can have a filter effect at a large viewing angle, and the overall brightness of the light at other viewing angles after exiting the display apparatus can be enhanced.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the exemplary embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
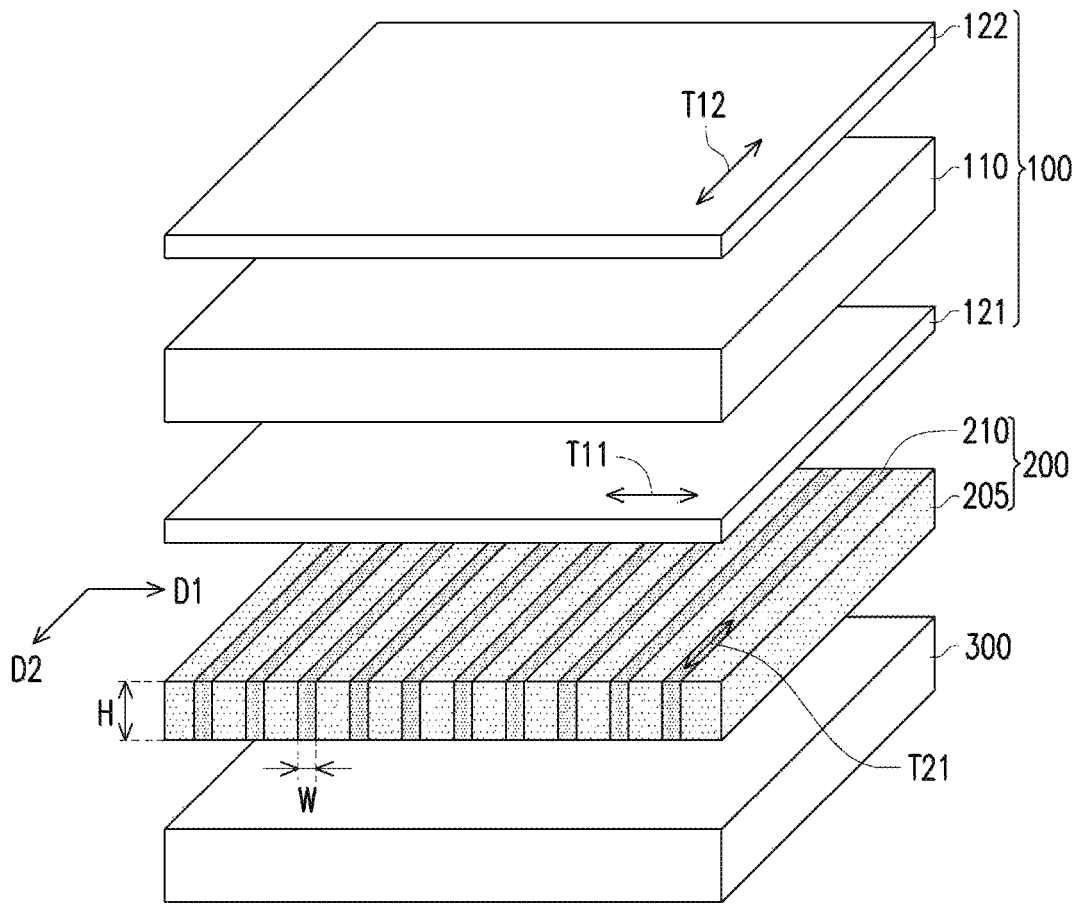
FIG. 1 is a schematic exploded view showing a display apparatus according to a first embodiment of the disclosure.
Figure 2:
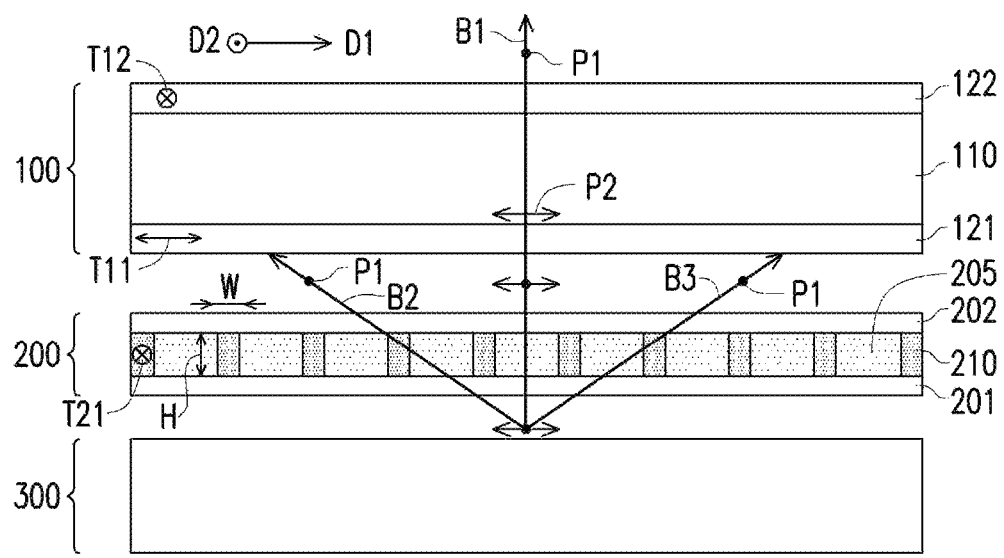
FIG. 2 is a schematic cross-sectional view showing the display apparatus of FIG. 1.

FIG. 1 is a schematic exploded view showing a display apparatus according to a first embodiment of the disclosure. FIG. 2 is a cross-sectional view showing the display apparatus of FIG. 1. For the sake of clarity, FIG. 1 omits the illustration of a substrate 201 and a substrate 202 of FIG. 2.

Referring to FIG. 1 and FIG. 2, a display apparatus 10 includes a display panel 100 and a viewing angle control device 200. In this embodiment, the display panel 100 is, for example, a liquid crystal display panel or another suitable non-self-luminous display panel. Therefore, the display apparatus 10 may selectively include a backlight module 300. The display panel 100 overlaps the viewing angle control device 200. For example, the viewing angle control device 200 is located between the display panel 100 and the backlight module 300. In another embodiment, the display panel 100 may be located between the viewing angle control device 200 and the backlight module 300. However, the disclosure is not limited thereto, and in other embodiments, the display panel of the display apparatus may also be an organic light emitting diode (OLED) panel, a micro light emitting diode (micro LED) panel, or another suitable self-luminous display panel. In that case, it is not required to additionally dispose a backlight module, and the viewing angle control device is disposed on the light emitting side of the self-luminous display panel.

In this embodiment, the display panel 100 may include a liquid crystal cell 110 and a first polarizer 121 and a second polarizer 122 located on two opposite sides of the liquid crystal cell 110. The first polarizer 121 is disposed on a side of the display panel 100 facing the viewing angle control device 200. The first polarizer 121 and the second polarizer 122 respectively have a transmission axis T11 and a transmission axis T12, and an axial direction of the transmission axis T11 of the first polarizer 121 is perpendicular to an axial direction of the transmission axis T12 of the second polarizer 122. After a beam passes through the first polarizer 121, a beam with a second linear polarization P2 may be formed, or the first polarizer 121 may only allow a beam with the second linear polarization P2 to pass. Further, the liquid crystal cell 110 may include a liquid crystal layer (not shown) and two electrode layers (not shown) disposed on two opposite sides of the liquid crystal layer. When the display panel 100 (or the liquid crystal cell 110) is activated, the two electrode layers may respectively have different potentials (e.g., a ground potential and a high potential). The potential difference between the two electrode layers may form an electric field in the liquid crystal layer, and the electric field may drive liquid crystal molecules of the liquid crystal layer to rotate to form an arrangement state corresponding to the potential difference. Through different arrangements of the liquid crystal molecules, the phase retardation of the beam transmitted in the liquid crystal layer can be changed, thereby adjusting the polarization state of this beam.

For example, after a beam B1 exiting the first polarizer 121 and having the second linear polarization P2 passes through the liquid crystal cell 110, since the polarization state is adjusted to a first linear polarization P1 of which the polarization direction is the same as (parallel to) the transmission axis T12 of the second polarizer 122 (for example, the display panel 100 is not activated), the beam B1 can pass through the second polarizer 122, so that the pixels of the display panel 100 are in a bright state. Conversely, after the beam B1 exiting the first polarizer 121 and having the second linear polarization P2 passes through the liquid crystal cell 110, if the polarization state is still the second linear polarization P2 (for example, the display panel 100 is activated) and the beam B1 is absorbed by the second polarizer 122, the pixels of the display panel 100 will be in a dark state. By arranging multiple pixel units respectively in a bright state, a dark state, or a grayscale state between the bright state and the dark state on the display panel 100, an image desired to be presented can be formed. For convenience of illustration herein, the display panel 100 displays a white image as an example.

Referring to FIG. 1 and FIG. 2 again, further, the viewing angle control device 200 has a plurality of first polarizing portions 210 and a plurality of transmissive portions 205. The first polarizing portions 210 are arranged along a direction D1 (for example, arranged on a substrate 201) and extend in a direction D2. Specifically, the transmissive portions 205 are provided between any two adjacent first polarizing portions 210, and the transmissive portions 205 exhibit a high transmittance with respect to the beam emitted by the backlight module 300. In other words, the first polarizing portions 210 and the transmissive portions 205 are alternately arranged along the direction D1. On the other hand, the first polarizing portion 210 has a width W in the direction D1 and a height H in a direction perpendicular to the direction D1 and the direction D2, and a ratio (H/W) of the height H to the width W of the first polarizing portion 210 is greater than 1. In an exemplary embodiment, the ratio of the height H to the width W of the first polarizing portion 210 may be greater than 3. Accordingly, the polarizability of the beam at a large viewing angle can be increased, and the light energy loss of the beam after passing through the viewing angle control device 200 can be effectively reduced.

It is noted that, by configuring a difference in the refractive index between the first polarizing portion 210 and the transmissive portion 205 in the wavelength range of 400 nm to 700 nm (i.e., the visible light band) to be less than 0.3, the rate of reflection (for example, the reflectivity) of the beam occurring at the interface between the first polarizing portion 210 and the transmissive portion 205 can be reduced, thereby increasing the polarization effect of the viewing angle control device 200 on the beam at the large viewing angle. It is noted that, in this embodiment, the number and the pitch (i.e., the distribution density) of the plurality of first polarizing portions 210 (or the plurality of transmissive portions 205) are only exemplary, and the disclosure is not limited to the content shown in the drawings. In other embodiments, the distribution density of the first polarizing portions 210 may also be adjusted according to the actual design requirements (e.g., the polarizability distribution at different viewing angles).

In this embodiment, the first polarizing portion 210 of the viewing angle control device 200 has a transmission axis T21, and an axial direction of the transmission axis T21 of the first polarizing portion 210 is perpendicular to the axial direction of the transmission axis T11 of the first polarizer 121. Therefore, a beam exiting the viewing angle control device 200 at a large angle (e.g., a beam passing obliquely through the first polarizing portion 210) cannot pass through the first polarizer 121 of the display panel 100. Accordingly, the viewing angle range of the display apparatus 10 can be reduced, and namely the anti-peeping effect can be achieved. It is noted that, since the plurality of first polarizing portions 210 are arranged along the direction D1 and extend in the direction D2, the arrangement direction (i.e., the direction D1) of the plurality of first polarizing portions 210 may be defined as the viewing angle control direction of the display apparatus 10.

Specifically, referring to FIG. 2, after the beam B1 from the backlight module 300 passes through the transmissive portion 205 located between two first polarizing portions 210, the beam B1 may be transmitted to the display panel 100 while still in its original unpolarized state. A beam B2 and a beam B3, which also come from the backlight module 300 and enter the viewing angle control device 200 at a large angle, lose part of the light energy (e.g., light energy in the direction other than the direction of the first linear polarization P1) after passing through the first polarizing portion 210 and form beams with the first linear polarization P1 which are transmitted to the display panel 100. Since the beam B1 is an unpolarized beam, the beam B1 can pass through the first polarizer 121 to form a beam with the second linear polarization P2. The polarization directions of the beam B2 and the beam B3 are perpendicular to the transmission axis T11 of the first polarizer 121, so the beam B2 and the beam B3 are absorbed by the first polarizer 121 and cannot pass through the display panel 100. In other words, through the perpendicular relationship between the transmission axes of the first polarizing portion 210 of the viewing angle control device 200 and the first polarizer 121 of the display panel 100, the display apparatus 10 can achieve a filter effect at a large viewing angle. Namely, the viewing angle range of the display apparatus 10 can be reduced to achieve the purpose of peeping prevention.

It is noted that the transmittance (or the polarizability) of the viewing angle control device 200 at a large viewing angle (e.g., a viewing angle greater than 45 degrees) may be determined by the number of the first polarizing portions 210 (i.e., the distribution density of the first polarizing portions 210) which the beam needs to pass through. However, the disclosure is not limited thereto, and in other embodiments, the transmittance of the viewing angle control device 200 at a large viewing angle may be further determined by the degree of polarization of the first polarizing portion 210. For example, the distribution density of the first polarizing portions 210 may be increased, so that the beam B2 originally passes through only one first polarizing portion 210 but now passes through two first polarizing portions 210. Accordingly, the degree of polarization of the first polarizing portion 210 may be reduced, so as to facilitate the selection of the material of the first polarizing portion 210.

Specifically, the manufacturing method of the viewing angle control device 200 may include forming a plurality of first polarizing portions 210 separate from each other by photolithography on a polarizing layer having a great film thickness (e.g., greater than 10 μm), and filling a plurality of trenches defined by the first polarizing portions 210 with a gel material having a high light transmittance and curing it to form transmissive portions 205 (it is noted that, the height of the first polarizing portions is less than the thickness of the polarizing layer). However, the disclosure is not limited thereto, and in an embodiment, alternatively, a light-transmitting material layer and a polarizing material layer may be alternately stacked to form a multi-layer stacked structure, which is then cut along the stacking direction according to the required size to obtain a viewing angle control device 200. On the other hand, the manufacturing method of the viewing angle control device 200 may further selectively include attaching a protective layer on two opposite surfaces of the first polarizing portions 210 and the transmissive portions 205 perpendicular to the arrangement direction to improve the reliability and durability of the viewing angle control device 200.

For example, the material of the transmissive portion 205 may include polycarbonate (PC), poly(methyl methacrylate) (PMMA), cyclo-olefin polymer (COP), cyclo-olefin copolymer (COC), polymerized siloxanes, or other materials with high light transmittance. In this embodiment, the viewing angle control device 200 may selectively have another substrate 202, and the plurality of first polarizing portions 210 and the plurality of transmissive portions 205 are sandwiched between the substrate 201 and the substrate 202. The materials of the two substrates may include glass, polyethylene terephthalate (PET), polyimide, or other films exhibiting both light transmittance and protection effect.

Some other embodiments will be provided below to describe the disclosure in detail. The same components will be labeled with the same symbols, and the description of the same technical content will be omitted. Reference may be made to the foregoing embodiment for the omitted descriptions, which will not be repeated herein.

Figure 3:
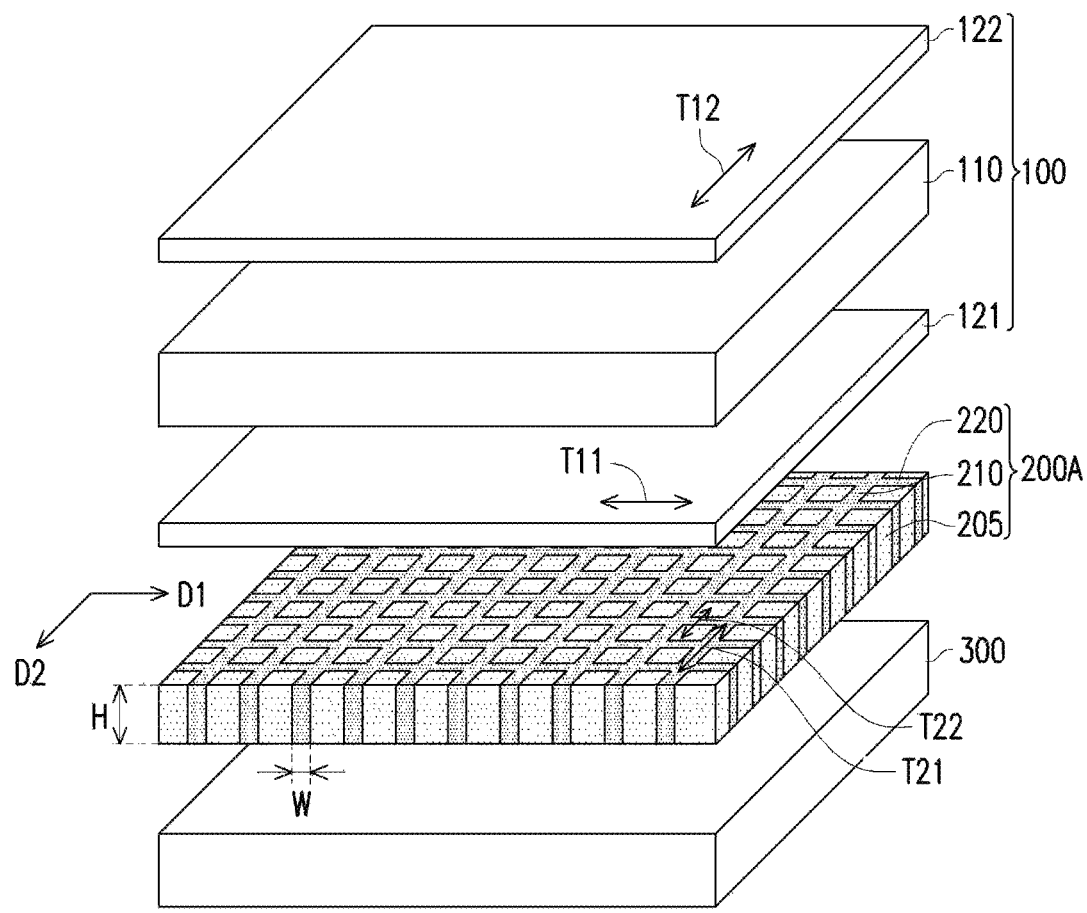
FIG. 3 is a schematic exploded view showing a display apparatus according to a second embodiment of the disclosure.

FIG. 3 is a schematic exploded view showing a display apparatus according to a second embodiment of the disclosure. Referring to FIG. 3, the difference between a display apparatus 11 of this embodiment and the display apparatus 10 of FIG. 1 lies in the configuration of the polarizing portion. In this embodiment, a viewing angle control device 200A further includes a plurality of second polarizing portions 220, and the second polarizing portions 220 are arranged along the direction D2 and extend in the direction D1. In other words, the second polarizing portions 220 and the plurality of transmissive portions 205 are alternately arranged along the direction D2, and the second polarizing portions 220 intersect with the first polarizing portions 210 (for example, the first polarizing portions 210 and the second polarizing portions 220 are on the same layer, and arranged in a grid pattern). For example, each first polarizing portion 210 and each second polarizing portion 220 have an intersection.

Specifically, the second polarizing portion 220 has a transmission axis T22, and an axial direction of the transmission axis T22 is parallel to the axial direction of the transmission axis T21 of the first polarizing portion 210. In other words, the axial direction of the transmission axis T22 of the second polarizing portion 220 is also perpendicular to the axial direction of the transmission axis T11 of the first polarizer 121. Accordingly, the viewing angle control device 200A can also provide a filter effect at large angle in the direction D2, and the display apparatus 11 adopting the viewing angle control device 200A can also have an anti-peeping function in the direction D2 to satisfy different product design requirements.

Figure 4:
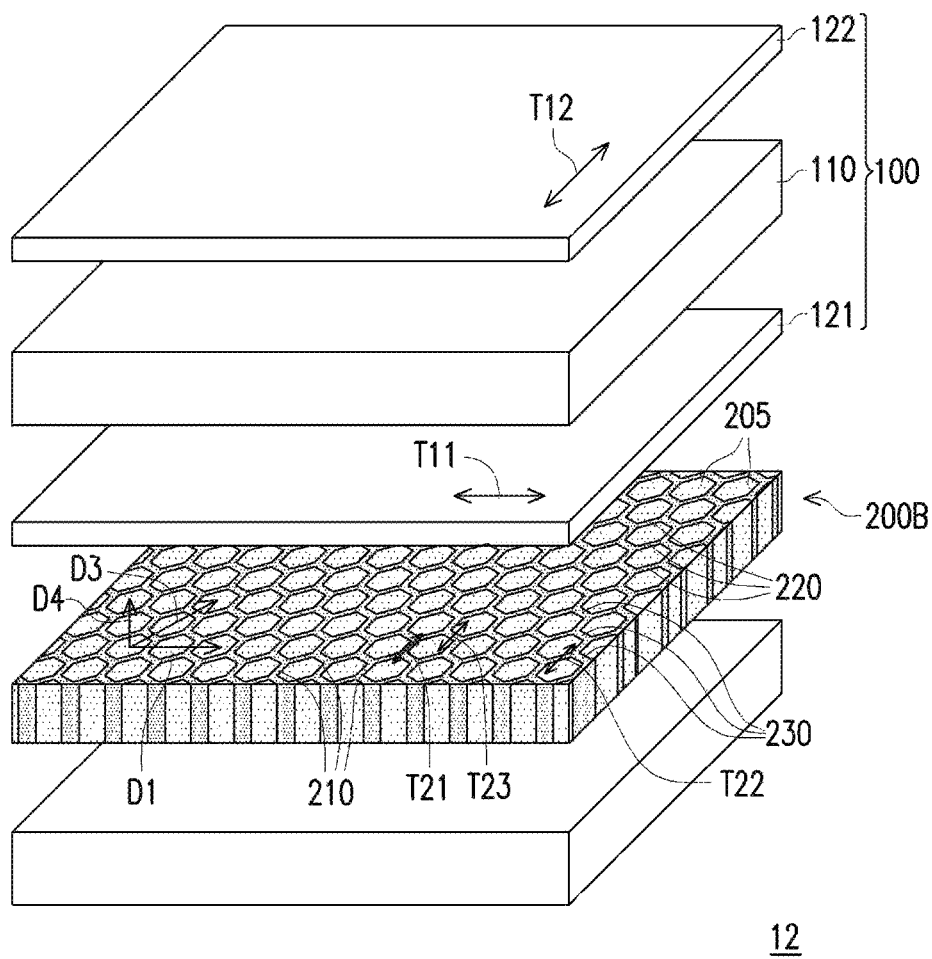
FIG. 4 is a schematic exploded view showing a display apparatus according to a third embodiment of the disclosure.

FIG. 4 is a schematic exploded view showing a display apparatus according to a third embodiment of the disclosure. Referring to FIG. 4, the difference between a display apparatus 12 of this embodiment and the display apparatus 10 of FIG. 1 lies in the configuration of the polarizing portion. Specifically, a viewing angle control device 200B further includes a plurality of second polarizing portions 220 and a plurality of third polarizing portions 230. The second polarizing portions 220 are arranged along a direction D4 and are respectively connected to the plurality of first polarizing portions 210 and the plurality of third polarizing portions 230. The third polarizing portions 230 are arranged along a direction D3 and are respectively connected to the plurality of first polarizing portions 210 and the plurality of second polarizing portions 220. More specifically, the polarizing portions of the viewing angle control device 200B of this embodiment are arranged in a honeycomb pattern.

Specifically, the second polarizing portion 220 has a transmission axis T22, the third polarizing portion 230 has a transmission axis T23, and the axial directions of the transmission axis T22 and the transmission axis T23 are parallel to the axial direction of the transmission axis T21 of the first polarizing portion 210. In other words, the axial direction of the transmission axis T22 of the second polarizing portion 220 and the axial direction of the transmission axis T23 of the third polarizing portion 230 are also perpendicular to the axial direction of the transmission axis T11 of the first polarizer 121. Accordingly, in addition to providing a filter effect at a large angle in the direction D1, the viewing angle control device 200B can also provide a filter effect at a large angle in the direction D3 and the direction D4. Moreover, the display apparatus 12 adopting the viewing angle control device 200B can have an anti-peeping function respectively in the direction D1, the direction D3, and the direction D4 to satisfy different product design requirements.

Figure 5:
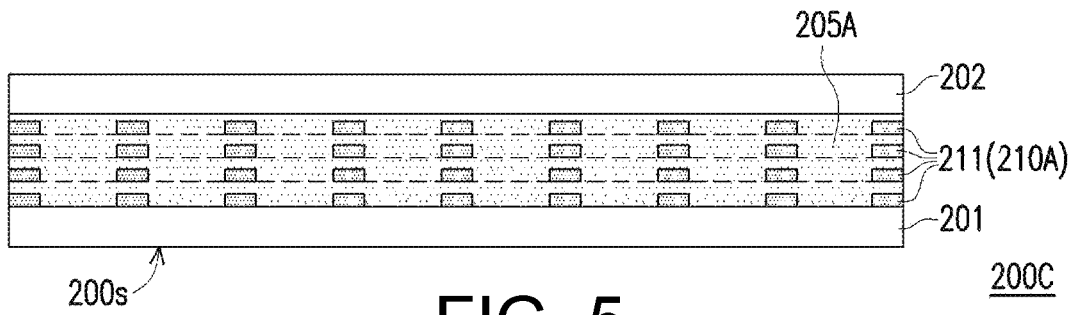
FIG. 5 is a schematic cross-sectional view showing a viewing angle control device according to an embodiment of the disclosure.
Figure 6:
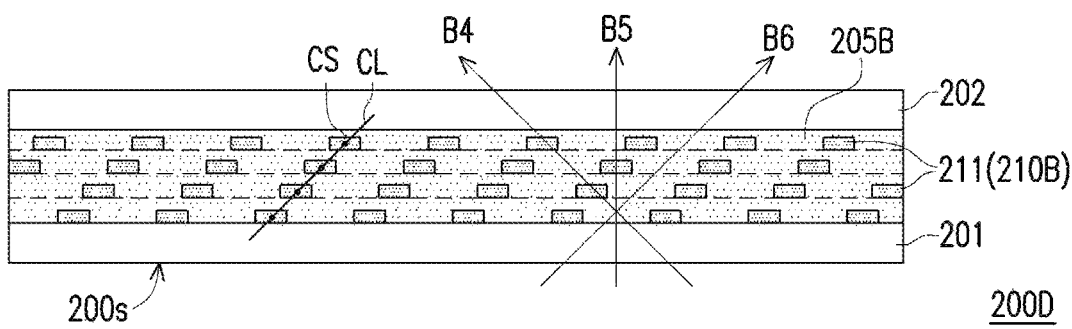
FIG. 6 is a schematic cross-sectional view showing a viewing angle control device according to another embodiment of the disclosure.
Figure 7:
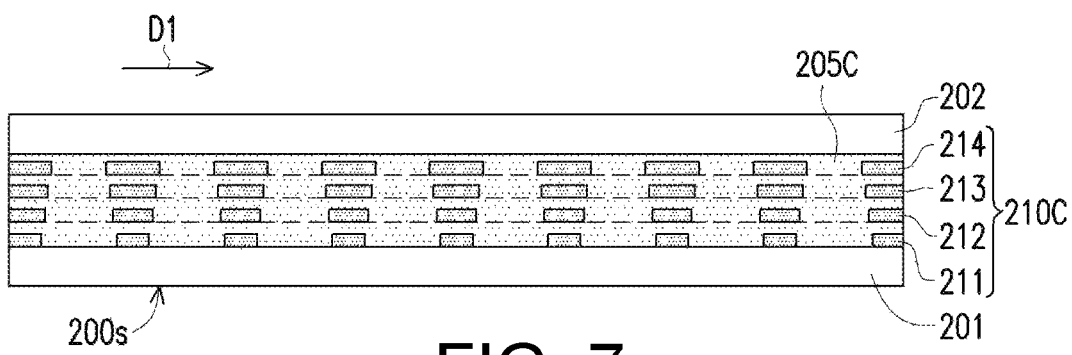
FIG. 7 is a schematic cross-sectional view showing a viewing angle control device according to still another embodiment of the disclosure.
Figure 8:
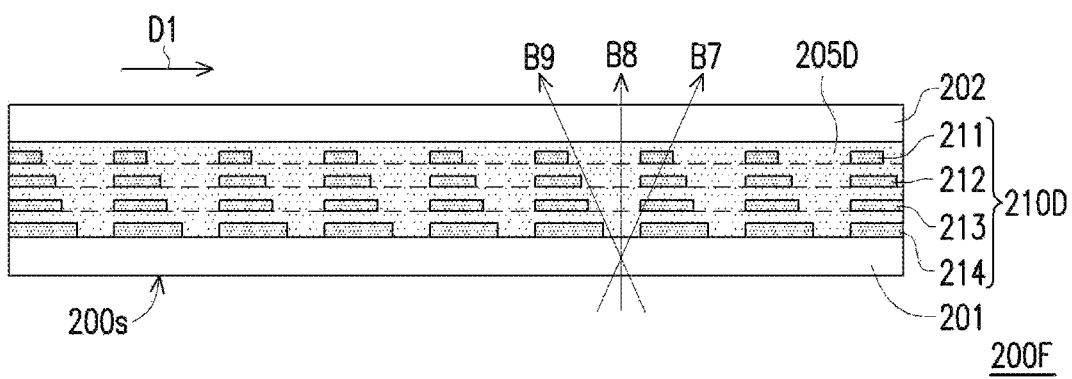
FIG. 8 is a schematic cross-sectional view showing a viewing angle control device according to still another embodiment of the disclosure.

FIG. 5 is a schematic cross-sectional view showing a viewing angle control device according to an embodiment of the disclosure. FIG. 6 is a schematic cross-sectional view showing a viewing angle control device according to another embodiment of the disclosure. FIG. 7 is a schematic cross-sectional view showing a viewing angle control device according to still another embodiment of the disclosure. FIG. 8 is a schematic cross-sectional view showing a viewing angle control device according to still another embodiment of the disclosure. Particularly, the viewing angle control devices shown in FIG. 5 to FIG. 8 are also applicable to the display apparatuses of the foregoing embodiments.

Referring to FIG. 5, the main difference between a viewing angle control device 200C of this embodiment and the viewing angle control device 200 of FIG. 2 lies in that the configuration of the polarizing portion is different. Specifically, each first polarizing portion 210A of the viewing angle control device 200C has a plurality of polarizing patterns 211 (e.g., a plurality of polarizing patterns 211 separate from each other), and the orthographic projections of the polarizing patterns 211 on a light entrance surface 200s of the viewing angle control device 200C overlap each other. In this embodiment, the polarizing patterns 211 may be flush with each other in the normal direction of the substrate 201. In other words, the orthographic projections of the polarizing patterns 211 on the light entrance surface 200s completely overlap each other, but the disclosure is not limited thereto.

On the other hand, the manufacturing method of the viewing angle control device 200C may include alternately forming a material layer containing polarizing patterns 211 and a light-transmitting material layer to form a multi-layer stacked structure on substrate 201. Alternatively, a multi-layer stacked structure of material layers including the polarizing patterns 211 (for example, a height of the material layers is greater than a height of the polarizing patterns) may be formed. In each of the material layers including the polarizing patterns 211, a light-transmitting material layer may be provided between two polarizing patterns 211 to form a transmissive portion 205A of the viewing angle control device 200C. In this embodiment, the material of the light-transmitting material layer (or the transmissive portion 205A) may include polycarbonate (PC), poly(methyl methacrylate) (PMMA), cyclo-olefin polymer (COP), cyclo-olefin copolymer (COC), polymerized siloxanes, or other materials with high light transmittance, but the disclosure is not limited thereto.

It is noted that, in this embodiment, the number of the polarizing patterns 211 of the first polarizing portion 210A is exemplarily described to be four as an example, but it does not mean that the disclosure is limited to the content shown in the drawings. In other embodiments, the number of the polarizing patterns 211 of the first polarizing portion 210A may also be adjusted according to the actual design requirements (e.g., the aspect ratio of the polarizing portion).

Referring to FIG. 6, the main difference between a viewing angle control device 200D of this embodiment and the viewing angle control device 200C of FIG. 5 lies in that the arrangement of the polarizing patterns is different. In this embodiment, the plurality of polarizing patterns 211 of each first polarizing portion 210B are staggered with respect to each other in the normal direction of the substrate 201. For example, each polarizing pattern 211 has a symmetry center CS, and a connection line CL connecting the symmetry centers CS of the plurality of polarizing patterns 211 of each first polarizing portion 210B is oblique with respect to the light entrance surface 200s. In other words, the plurality of polarizing patterns 211 of each first polarizing portion 210B (or transmissive portion 205B) are arranged obliquely with respect to the normal direction of the substrate 201.

Further, a beam B4 (the transmission path of the beam B4 is non-parallel to the connection line CL) and a beam B5 entering the viewing angle control device 200D pass through the polarizing patterns 211 of the first polarizing portion 210B on their transmission paths. Therefore, after passing through the viewing angle control device 200D, the beam B4 and the beam B5 can be absorbed by the first polarizer (as shown in FIG. 2). The transmission path of a beam B6 (for example, the transmission path of the beam B6 is parallel to the connection line CL) in the viewing angle control device 200D does not pass through the polarizing patterns 211 of the first polarizing portion 210B (namely, the beam B6 is transmitted in the transmissive portion 205B), so after exiting the viewing angle control device 200D, the beam B6 can pass through the first polarizer of the display panel (as shown in FIG. 2). In other words, by arranging the first polarizing portion 210B obliquely with respect to the normal direction of the substrate 201, the viewing angle range (for example, the center of the viewing angle range) of the display apparatus adopting the viewing angle control device 200D can deviate from the front viewing direction (namely, the display apparatus can provide an anti-peeping effect within a range covering the front viewing angle and one side viewing angle).

Referring to FIG. 7, the main difference between a viewing angle control device 200E of this embodiment and the viewing angle control device 200C of FIG. 5 lies in that the configuration of the polarizing patterns is different. In this embodiment, each first polarizing portion 210C includes a plurality of polarizing patterns, such as a polarizing pattern 211, a polarizing pattern 212, a polarizing pattern 213, and a polarizing pattern 214, and the area of an orthographic projection of each polarizing pattern on the light entrance surface 200s is different from each other. For example, an increasing order (from smaller to larger ones) of the widths of the plurality of polarizing patterns of each first polarizing portion 210C in the direction D1 is as follows: the polarizing pattern 211, the polarizing pattern 212, the polarizing pattern 213, and the polarizing pattern 214. In other words, the areas of the orthographic projections of the plurality of polarizing patterns of the first polarizing portion 210C on the light entrance surface 200s gradually increase in a direction away from the light entrance surface 200s. From another perspective, the width of a transmissive portion 205C in the direction D1 gradually decreases in a direction from the substrate 201 toward the substrate 202. Accordingly, different product design requirements (e.g., the viewing angle range of the display apparatus) can be satisfied.

Referring to FIG. 8, the main difference between a viewing angle control device 200F of this embodiment and the viewing angle control device 200C of FIG. 5 lies in that the configuration of the polarizing patterns is different. In this embodiment, each first polarizing portion 210D includes a plurality of polarizing patterns, such as a polarizing pattern 211, a polarizing pattern 212, a polarizing pattern 213, and a polarizing pattern 214, and the area of an orthographic projection of each polarizing pattern on the light entrance surface 200s is different from each other. For example, an increasing order (from smaller to larger ones) of the widths of the plurality of polarizing patterns of the first polarizing portion 210D in the direction D1 is as follows: the polarizing pattern 211, the polarizing pattern 212, the polarizing pattern 213, and the polarizing pattern 214. In other words, the areas of the orthographic projections of the plurality of polarizing patterns of the first polarizing portion 210D on the light entrance surface 200s gradually decrease in a direction away from the light entrance surface 200s. From another perspective, the width of a transmissive portion 205D in the direction D1 gradually increases in a direction from the substrate 201 toward the substrate 202. Moreover, in this embodiment, one side (e.g., the left side) of the plurality of polarizing patterns of the first polarizing portion 210D is flush with each other in the normal direction of the substrate 201.

Further, a beam B7 entering the viewing angle control device 200F passes through the polarizing patterns of the first polarizing portion 210D on its transmission path. Therefore, after passing through the viewing angle control device 200F, the beam B7 can be absorbed by the first polarizer (as shown in FIG. 2). The transmission paths of a beam B8 and a beam B9 in the viewing angle control device 200F do not pass through the polarizing patterns of the first polarizing portion 210D (namely, the beam B8 and the beam B9 are transmitted in the transmissive portion 205D), so after exiting the viewing angle control device 200F, the beam B8 and the beam B9 can pass through the first polarizer of the display panel (as shown in FIG. 2). In other words, by configuring the first polarizing portion 210D obliquely on one side, the viewing angle range of the display apparatus adopting the viewing angle control device 200F can only cover the front viewing angle and one side viewing angle (namely, the display apparatus can have an asymmetric anti-peeping effect at the side viewing angles).

Figure 9:
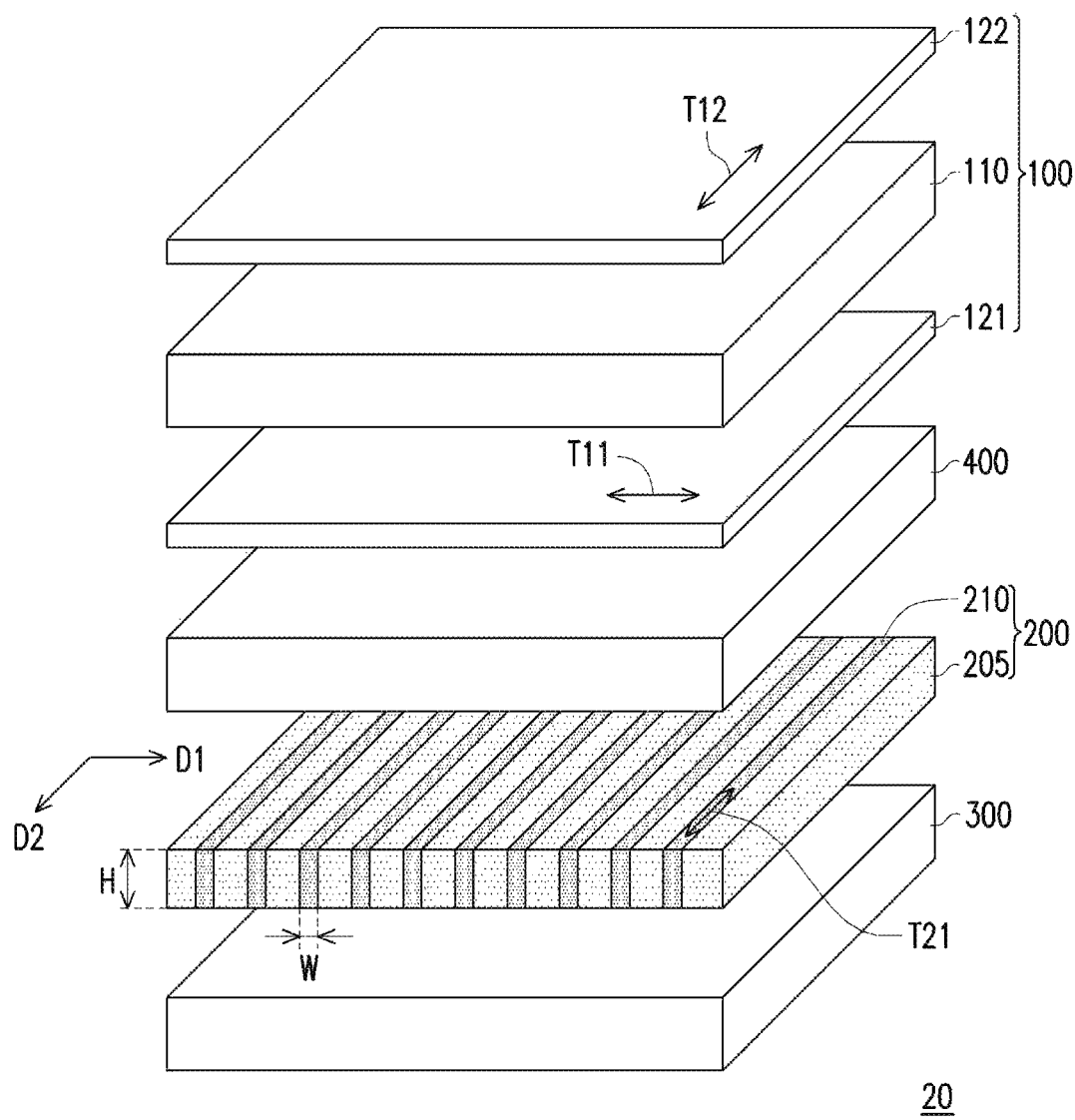
FIG. 9 is a schematic exploded view showing a display apparatus according to a fourth embodiment of the disclosure.
Figure 10A:
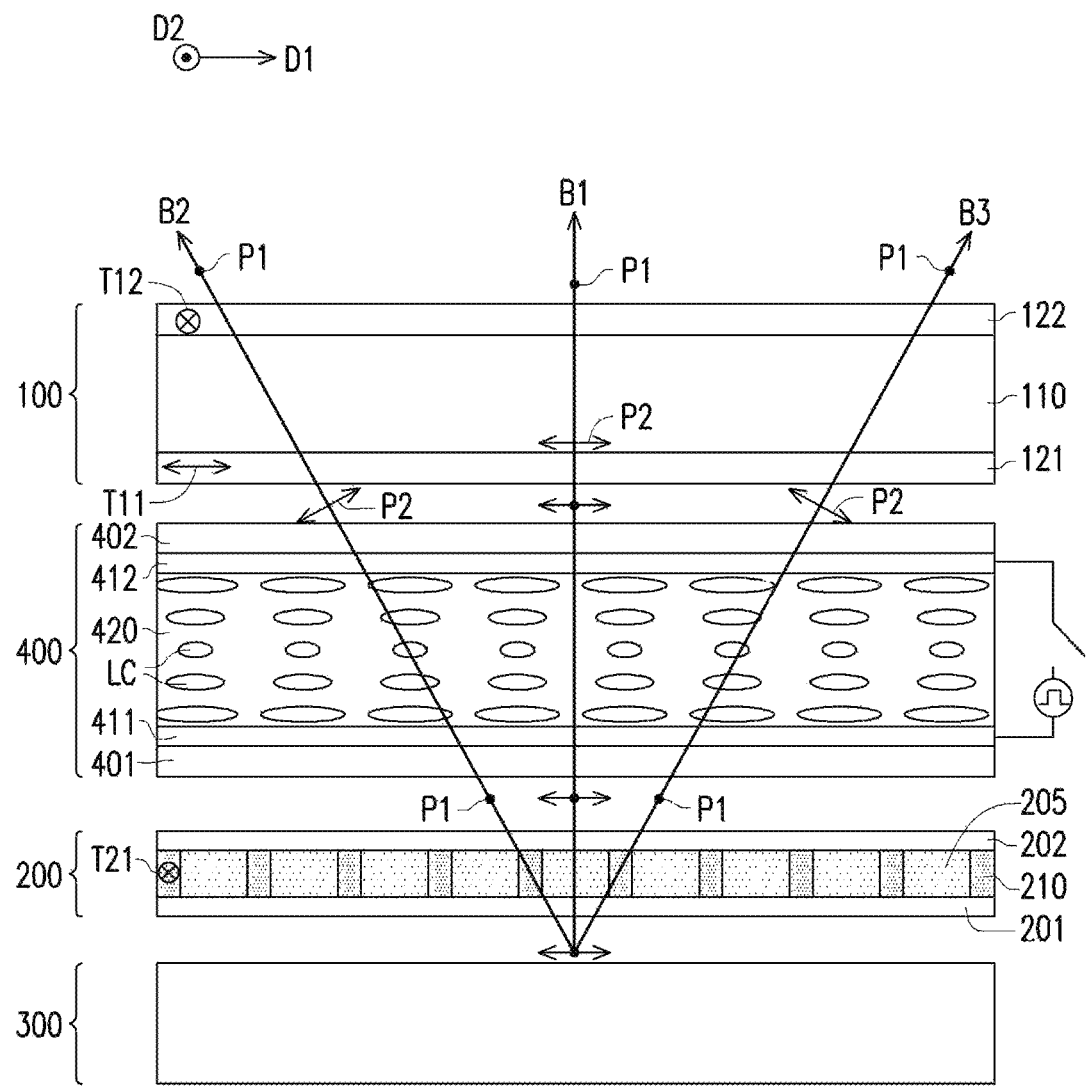
FIG. 10A to FIG. 10C are schematic cross-sectional views showing the display apparatus of FIG. 9 in different operation modes.
Figure 10B:
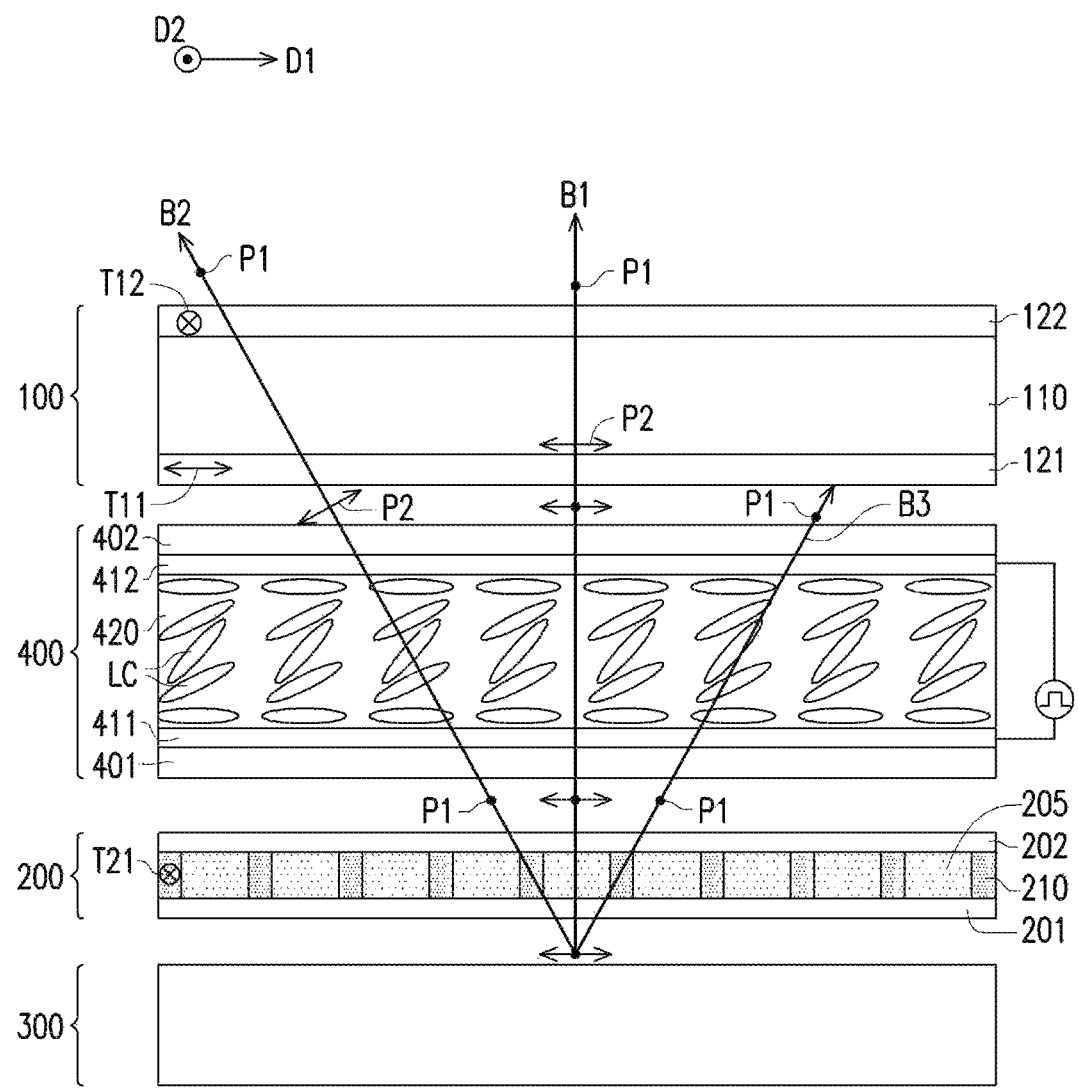
Figure 10C:
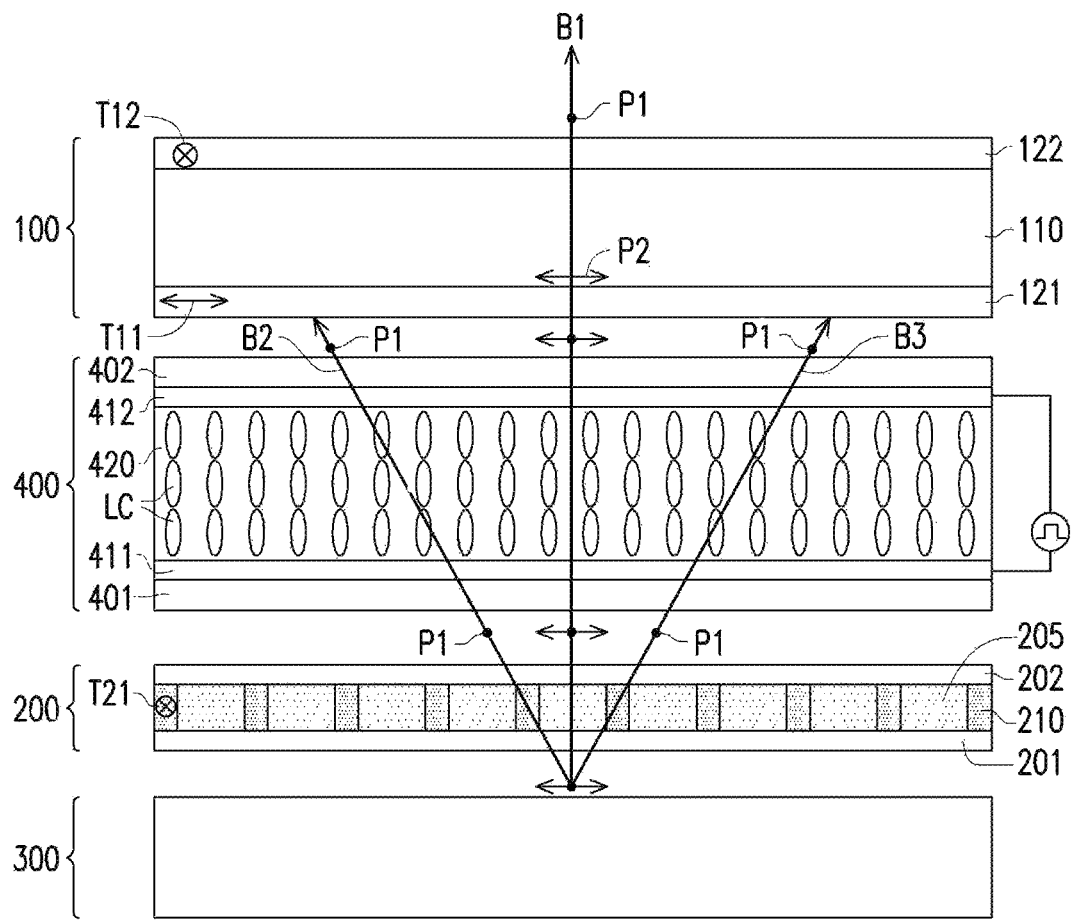

FIG. 9 is a schematic exploded view showing a display apparatus according to a fourth embodiment of the disclosure. FIG. 10A to FIG. 10C are schematic cross-sectional views showing the display apparatus of FIG. 9 in different operation modes. For the sake of clarity, FIG. 9 omits the illustration of the two substrates 201 and 202 in FIG. 10A to FIG. 10C.

Referring to FIG. 9 and FIG. 10A, the difference between a display apparatus 20 of this embodiment and the display apparatus 10 of FIG. 1 lies in that the display apparatus 20 further includes an electrically controlled viewing angle switch device 400. The electrically controlled viewing angle switch device 400 overlaps the viewing angle control device 200 and is located between the display panel 100 and the viewing angle control device 200. In this embodiment, the electrically controlled viewing angle switch device 400 may be selectively located between the display panel 100 and the backlight module 300, but the disclosure is not limited thereto.

In this embodiment, the electrically controlled viewing angle switch device 400 includes a liquid crystal layer 420, a first electrode layer 411, a second electrode layer 412, a first substrate 401, a second substrate 402, and two alignment films (not shown). The liquid crystal layer 420 is sandwiched between the two alignment films. Specifically, the alignment films are used to arrange multiple liquid crystal molecules LC of the liquid crystal layer 420 so that their optical axis is arranged in a predetermined direction. In this embodiment, the alignment directions of the two alignment films may intersect with each other (for example, non-parallel). For example, an included angle between the two alignment directions may range from 90 degrees to 270 degrees. Moreover, the liquid crystal layer 420 may include a twisted nematic liquid crystal (TN-LC). In other words, the electrically controlled viewing angle switch device 400 of this embodiment may include a twisted nematic liquid crystal cell (TN-LC cell) or a super twisted nematic liquid crystal cell (STN-LC cell). However, the disclosure is not limited thereto, and according to other embodiments, the operation mode of the liquid crystal cell of the electrically controlled viewing angle switch device may also be an electrically controlled birefringence (ECB) mode, an optically compensated bend (OCB) mode, an in-plane switching (IPS) mode, or a vertical alignment/multi domain vertical alignment (VA/MVA) mode. In the disclosure, according to the different operation modes of the liquid crystal cell, the electrode layer of the electrically controlled viewing angle switch device may be at least two electrode layers disposed on two opposite sides of the liquid crystal layer, or at least one electrode layer disposed on one side of the liquid crystal layer.

Further, the first electrode layer 411 of the electrically controlled viewing angle switch device 400 is disposed between the first substrate 401 and the liquid crystal layer 420, and the second electrode layer 412 is disposed between the second substrate 402 and the liquid crystal layer 420. Specifically, when the first electrode layer 411 and the second electrode layer 412 are enabled so that a potential difference is present between the two electrode layers, the potential difference may form an electric field between the two electrode layers to drive the liquid crystal molecules LC of the liquid crystal layer 420 to rotate. In this embodiment, the first electrode layer 411 and the second electrode layer 412 are, for example, light-transmissive electrodes, and the material of the light-transmissive electrodes includes indium tin oxide, indium zinc oxide, aluminum tin oxide, aluminum zinc oxide, other suitable oxides, ultrathin metal, metal mesh or wired grid, carbon nanotube, Ag nano-wire, graphene, or a stacked layer of at least two of the above.

Herein, three operation modes of the display apparatus 20, i.e., a share mode, a single-side anti-peeping mode, and a double-side anti-peeping mode, will be exemplarily described. First, referring to FIG. 10A, when the display apparatus 20 is operated in the share mode, no potential difference is present between the first electrode layer 411 and the second electrode layer 412 of the electrically controlled viewing angle switch device 400, and without the driving by an external electric field, the liquid crystal molecules LC are arranged along the alignment direction of the alignment film. For example, when the electrically controlled viewing angle switch device 400 is disabled, due to the arrangement of the liquid crystal molecules LC, the polarization state of the polarized light is changed as the beam passes through the liquid crystal layer 420 (e.g., changing from the direction of the second linear polarization P2 to the direction of the first linear polarization P1, or changing from the direction of the first linear polarization P1 to the direction of the second linear polarization P2).

At this time, the beam B2 and the beam B3 passing through the viewing angle control device 200 respectively have the first linear polarization P1, and after passing through the electrically controlled viewing angle switch device 400, the polarization states of the two beams can be converted from the first linear polarization P1 to the second linear polarization P2, where the polarization direction of the first linear polarization P1 is perpendicular to the direction of the second linear polarization P2. Since the beam B2 and the beam B3 entering the display panel 100 have the second linear polarization P2, they can pass through the first polarizer 121 of the display panel 100. On the other hand, after sequentially passing through the viewing angle control device 200 and the electrically controlled viewing angle switch device 400, the beam B1 is still in the unpolarized state. Therefore, the beam B1 can also pass through the first polarizer 121 of the display panel 100 after losing part of the light energy.

Next, referring to FIG. 10B, when the display apparatus 20 is operated in the single-side anti-peeping mode, the first electrode layer 411 and the second electrode layer 412 of the electrically controlled viewing angle switch device 400 are enabled and have different potentials, and the electric field formed by the potential difference between the two electrode layers can drive the liquid crystal molecules LC of the liquid crystal layer 420 to rotate. At this time, since the liquid crystal layer 420 can generate different phase retardations for the plurality of beams B1 to B3 entering at different angles (for example, depending on the included angle between the direction of the transmission path of the beam and the direction of a pre-tilt angle of the alignment film), the beams B1 to B3 can respectively have different polarization states after passing through the liquid crystal layer 420. For example, after passing through the liquid crystal layer 420, the beam B1 is still in the unpolarized state, and the beam B2 and the beam B3 respectively have the second linear polarization P2 and the first linear polarization P1.

Therefore, among the beams B1 to B3 from the liquid crystal layer 420, only the beam B1 and the beam B2 can pass through the first polarizer 121 of the display panel 100, and the beam B3 is absorbed because its polarization direction is perpendicular to the transmission axis T11 of the first polarizer 121. In other words, at this time, the display apparatus 20 has a single-side anti-peeping function. Specifically, in the single-side anti-peeping operation mode, an absolute value of the voltage difference between the two electrode layers of the electrically controlled viewing angle switch device 400 is greater than 0 V and less than the maximum operating voltage difference of the liquid crystal layer 420, where the maximum operating voltage is the voltage which drives the average optical axis direction of the liquid crystal layer 420 to be substantially perpendicular to the first substrate 401 (namely, the long axis of most of the liquid crystal molecules LC is perpendicular to the first substrate 401).

More specifically, when the long axis of the liquid crystal molecules LC of the liquid crystal layer 420 is not fully perpendicular to the first substrate 401, such arrangement results in different phase retardations for the beam B2 and the beam B3. For example, the phase retardation of the beam B3 is much smaller than the phase retardation of the beam B2. As a result, the polarization state of the beam B3 does not change significantly after passing through the electrically controlled viewing angle switch device 400. However, when the voltage applied between the two electrode layers is greater than the maximum operating voltage of the liquid crystal layer 420, the phase retardation of the beam B2 is also greatly reduced. As a result, the polarization state of the beam B2 (i.e., the first linear polarization P1) does not change significantly after passing through the electrically controlled viewing angle switch device 400, either, as shown in FIG. 10C. At this time, the beam B2 and the beam B3 cannot pass through the display panel 100. In other words, at this time, the display apparatus 20 has a double-side anti-peeping function, i.e., the double-side anti-peeping mode. Therefore, through the coordination between such an electrically controlled viewing angle switch device 400 having a (super) twisted nematic liquid crystal cell and the viewing angle control device 200, the functionality of the display apparatus 20 can be increased to satisfy different application scenarios.

It is noted that, in this embodiment, the transmission axis T11 of the first polarizer 121 is perpendicular to the transmission axis T21 of the first polarizing portion 210 of the viewing angle control device 200, but the disclosure is not limited thereto. In other embodiments, the transmission axis of the first polarizer may also be parallel to the transmission axis of the first polarizing portion of the viewing angle control device. When the electrically controlled viewing angle switch device is enabled, the display apparatus is in the share mode or the single-side anti-peeping mode. When the electrically controlled viewing angle switch device is disabled, the display apparatus is in the double-side anti-peeping mode.

Figure 11A:
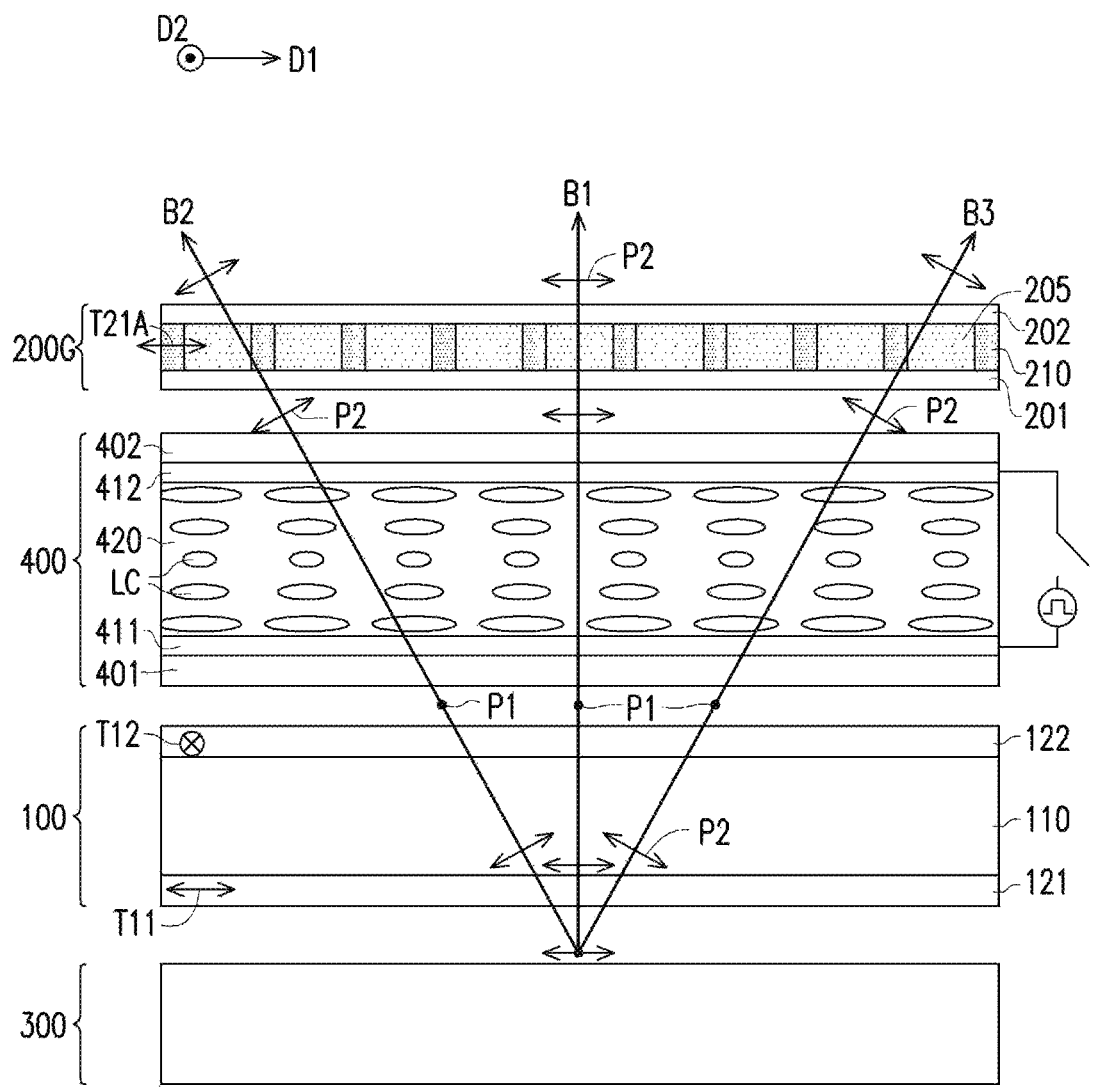
FIG. 11A and FIG. 11B are schematic cross-sectional views showing a display apparatus according to a fifth embodiment of the disclosure in different operation modes.
Figure 11B:
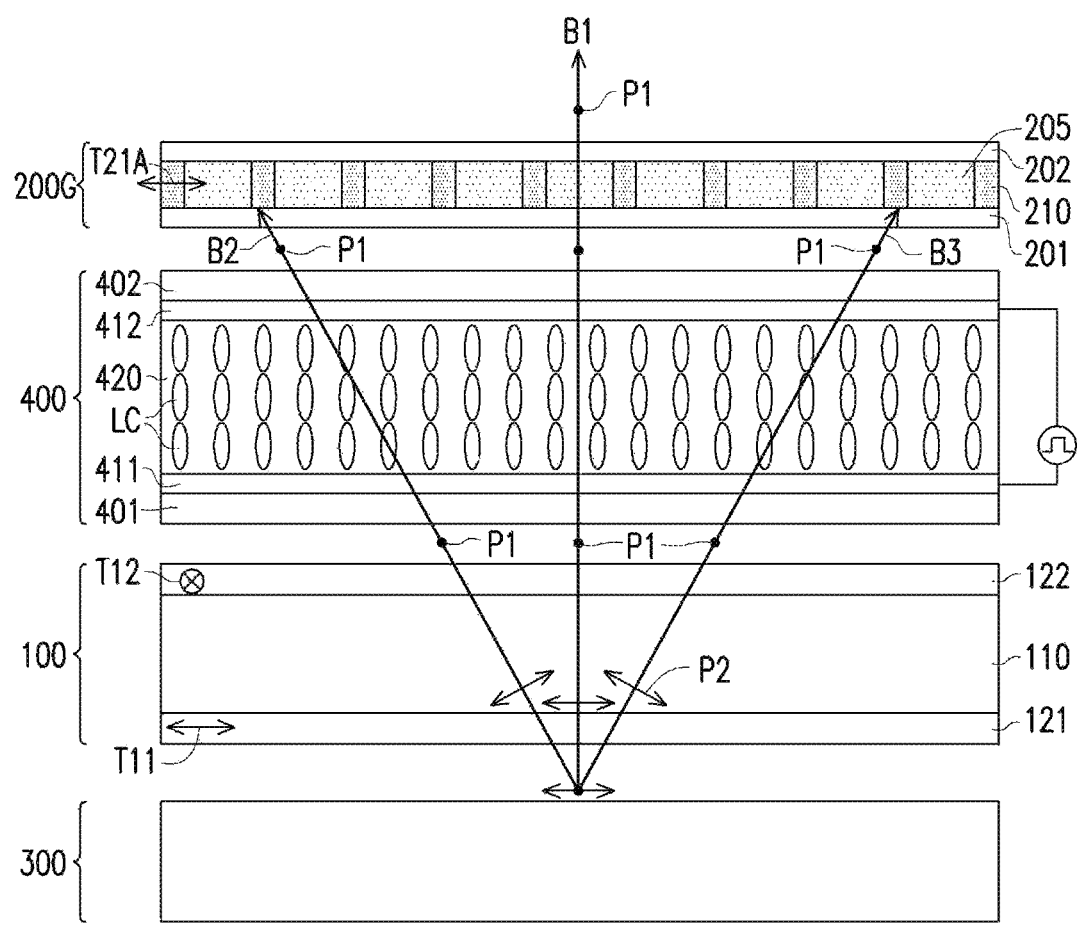

FIG. 11A and FIG. 11B are schematic cross-sectional views showing a display apparatus according to a fifth embodiment of the disclosure in different operation modes. Referring to FIG. 11A, the main difference between a display apparatus 21 of this embodiment and the display apparatus 20 of FIG. 10A lies in that the arrangement of the components is different. In this embodiment, the display panel 100 is disposed between the backlight module 300 and the electrically controlled viewing angle switch device 400, and a viewing angle control device 200G is disposed on one side of the electrically controlled viewing angle switch device 400 away from the display panel 100. Herein, two operation modes of the display apparatus 21, i.e., a share mode and an anti-peeping mode, will be exemplarily described.

First, when the display apparatus 21 is operated in the share mode, no potential difference is present between the first electrode layer 411 and the second electrode layer 412 of the electrically controlled viewing angle switch device 400, and without the driving by an external electric field, the liquid crystal molecules LC are arranged along the alignment direction of the alignment film. For example, in the case where the electrically controlled viewing angle switch device 400 is disabled, due to the arrangement of the liquid crystal molecules LC, the polarization state of the polarized light is changed as the beam passes through the liquid crystal layer 420 (e.g., changing from the direction of the second linear polarization P2 to the direction of the first linear polarization P1, or changing from the direction of the first linear polarization P1 to the direction of the second linear polarization P2). At this time, the plurality of beams exiting the display panel 100 (e.g., the beam B1, the beam B2, and the beam B3) all have the first linear polarization P1. After passing through the electrically controlled viewing angle switch device 400, the polarization states of the beams can be converted from the first linear polarization P1 to the second linear polarization P2, and the direction of the second linear polarization P2 is parallel to a transmission axis T21A of the first polarizing portion 210 of the viewing angle control device 200G. Therefore, the beams can all directly pass through the viewing angle control device 200G to be perceived by the human eye.

Next, referring to FIG. 11B, when the display apparatus 21 is operated in the anti-peeping mode, the first electrode layer 411 and the second electrode layer 412 of the electrically controlled viewing angle switch device 400 are enabled and have different potentials, and the electric field formed by the potential difference between the two electrode layers can drive the liquid crystal molecules LC of the liquid crystal layer 420 to rotate. At this time, since the liquid crystal layer 420 can generate different phase retardations for the plurality of beams B1 to B3 entering at different angles, the beams B1 to B3 respectively have different polarization states after passing through the liquid crystal layer 420. For example, when the voltage between the two electrode layers is set at the maximum operating voltage, the phase retardation generated by the liquid crystal layer 420 for the beams B1 to B3 is smaller, so the polarization states of the beams B1 to B3 (i.e., the first linear polarization P1) are not substantially changed. Since the polarization direction of the first linear polarization P1 is perpendicular to the transmission axis T21A of the first polarizing portion 210, the beam B2 and the beam B3 cannot pass through the viewing angle control device 200G. The beam B1 does not pass through the first polarizing portion 210 on its transmission path, so the beam B1 can directly pass through the viewing angle control device 200G. Accordingly, the display apparatus 21 can provide a double-side anti-peeping function.

Figure 12A:
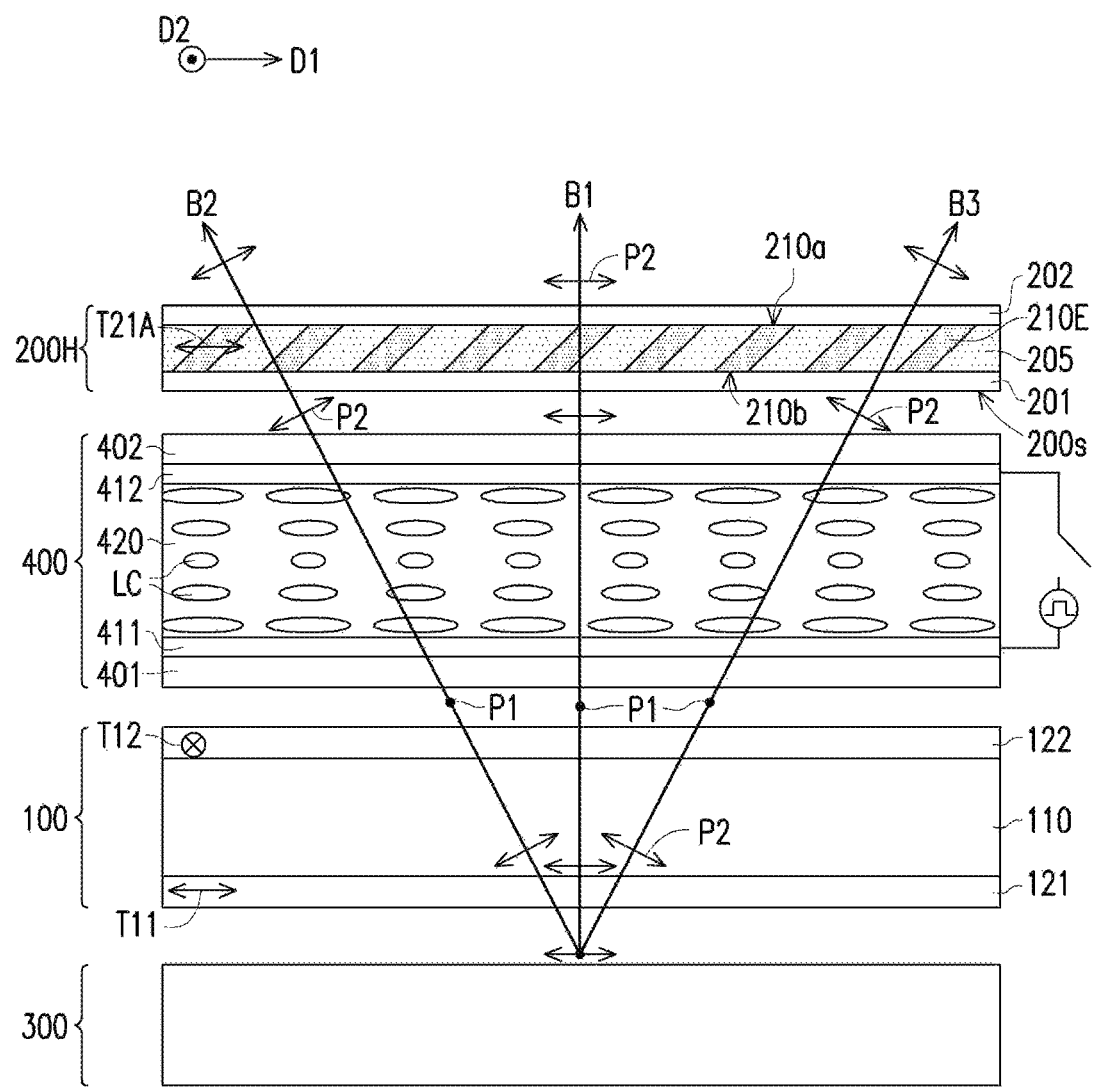
FIG. 12A and FIG. 12B are schematic cross-sectional views showing a display apparatus according to a sixth embodiment of the disclosure in different operation modes.
Figure 12B:
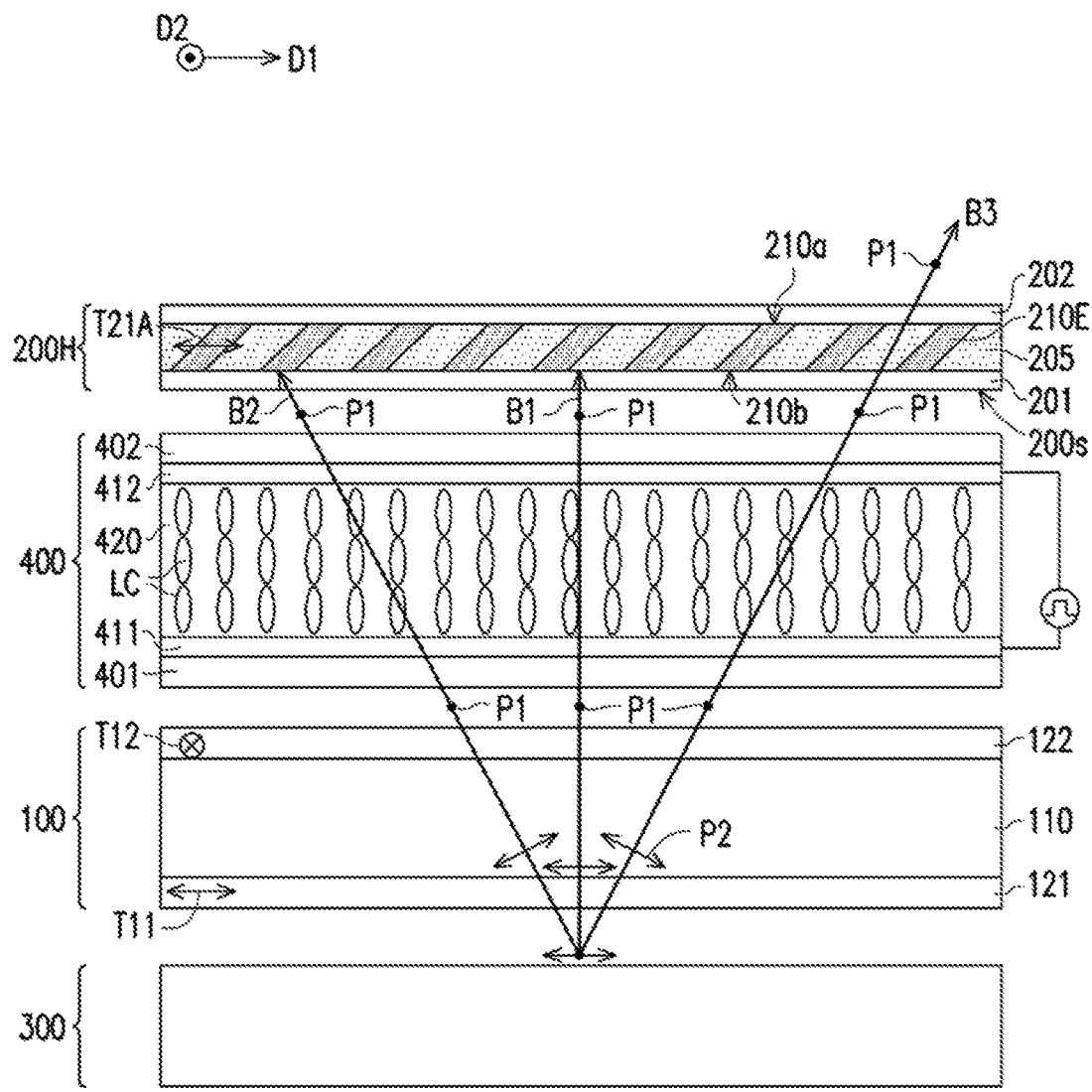

FIG. 12A and FIG. 12B are schematic cross-sectional views showing a display apparatus according to a sixth embodiment of the disclosure in different operation modes. Referring to FIG. 12A, the main difference between a display apparatus 22 of this embodiment and the display apparatus 21 of FIG. 11A lies in that the configuration of the polarizing portion of the viewing angle control device is different. In this embodiment, a first polarizing portion 210E of a viewing angle control device 200H has a first surface 210a and a second surface 210b which are not covered by the transmissive portion 205, and the orthographic projections of the first surface 210a and the second surface 210b, which are opposite to each other, on the light entrance surface 200s do not completely overlap each other. More specifically, the side wall of the first polarizing portion 210E covered by the transmissive portion 205 is oblique with respect to the light entrance surface 200s. In other words, the first polarizing portion 210E is arranged obliquely with respect to the normal direction of the light entrance surface 200s. For example, the viewing angle control device 200H of this embodiment may be implemented according to the viewing angle control device 200D of FIG. 6, and the number of the polarizing patterns 211 of each first polarizing portion 210B of FIG. 6 may be greater than four. Herein, two operation modes of the display apparatus 22, i.e., a share mode and an anti-peeping mode, will be exemplarily described.

First, referring to FIG. 12A, when the display apparatus 22 is operated in the share mode, no potential difference is present between the first electrode layer 411 and the second electrode layer 412 of the electrically controlled viewing angle switch device 400, and without the driving by an external electric field, the liquid crystal molecules LC are arranged along the alignment direction of the alignment film. For example, in the case where the electrically controlled viewing angle switch device 400 is disabled, due to the arrangement of the liquid crystal molecules LC, the polarization state of the polarized light is changed as the beam passes through the liquid crystal layer 420 (e.g., changing from the direction of the second linear polarization P2 to the direction of the first linear polarization P1, or changing from the direction of the first linear polarization P1 to the direction of the second linear polarization P2). At this time, the plurality of beams exiting the display panel 100 (e.g., the beam B1, the beam B2, and the beam B3) all have the first linear polarization P1. After passing through the electrically controlled viewing angle switch device 400, the polarization states of the beams can be converted from the first linear polarization P1 to the second linear polarization P2, and the direction of the second linear polarization P2 is parallel to the transmission axis T21A of the first polarizing portion 210E of the viewing angle control device 200H. Therefore, the beams can all directly pass through the viewing angle control device 200H to be perceived by the human eye.

Referring to FIG. 12B, when the display apparatus 22 is operated in the anti-peeping mode, the first electrode layer 411 and the second electrode layer 412 of the electrically controlled viewing angle switch device 400 are enabled and have different potentials, and the electric field formed by the potential difference between the two electrode layers can drive the liquid crystal molecules LC of the liquid crystal layer 420 to rotate. At this time, since the liquid crystal layer 420 can generate different phase retardations for the plurality of beams B1 to B3 entering at different angles, the beams B1 to B3 respectively have different polarization states after passing through the liquid crystal layer 420. For example, when the voltage between the two electrode layers is set at the maximum operating voltage, the phase retardation generated by the liquid crystal layer 420 for the beams B1 to B3 is smaller, so the polarization states of the beams B1 to B3 (i.e., the first linear polarization P1) are not changed substantially.

Since the polarization direction of the first linear polarization P1 is perpendicular to the transmission axis T21A of the first polarizing portion 210E, the beam B1 and the beam B2 cannot pass through the viewing angle control device 200H. The beam B3 does not pass through the first polarizing portion 210E on its transmission path, so the beam B3 can directly pass through the viewing angle control device 200H. Accordingly, the display apparatus 22 can provide an anti-peeping function within a range covering the front viewing angle and one side viewing angle, so as to satisfy different application scenarios.

Figure 13A:
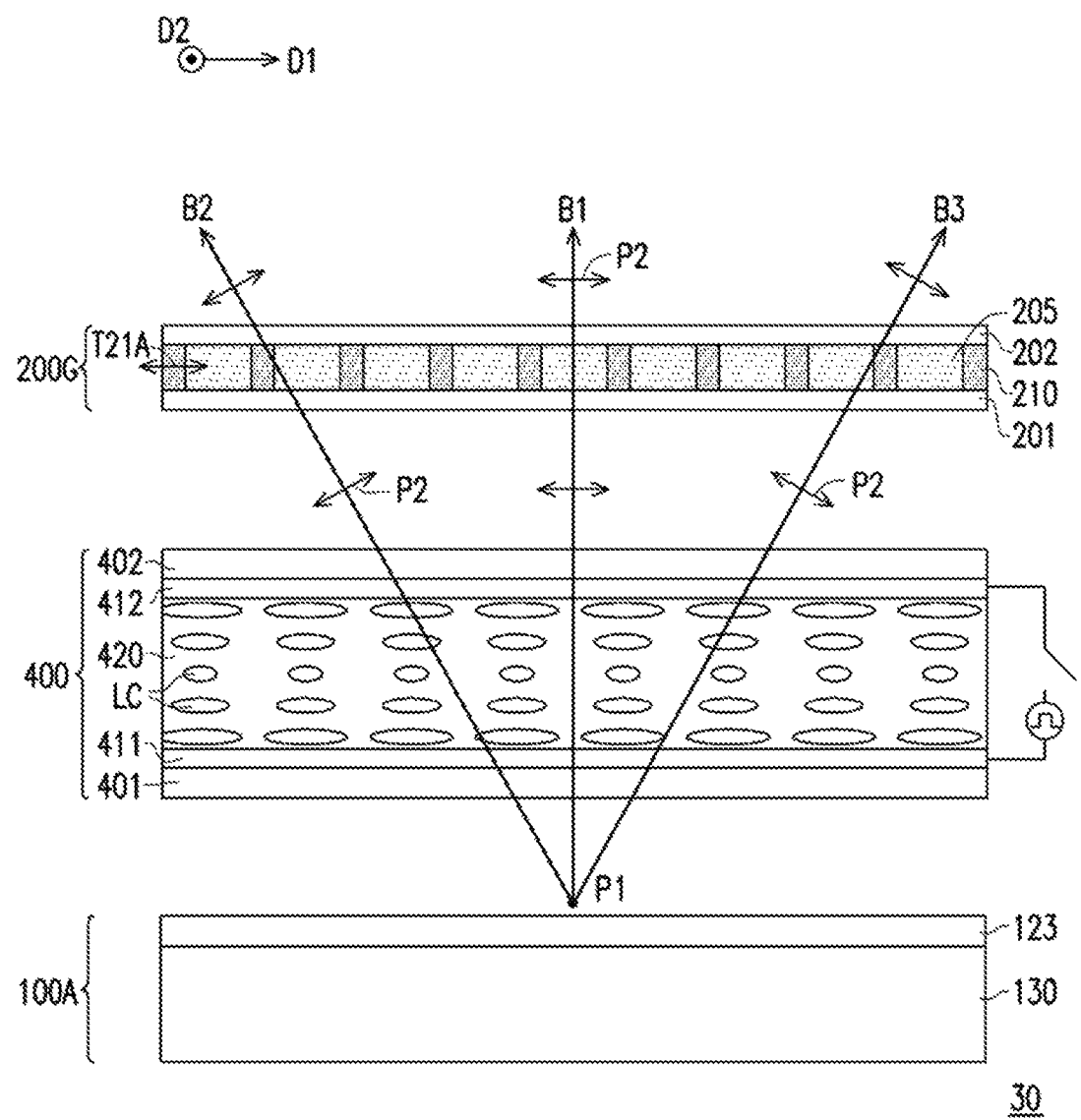
FIG. 13A and FIG. 13B are schematic cross-sectional views showing a display apparatus according to a seventh embodiment of the disclosure in different operation modes.
Figure 13B:
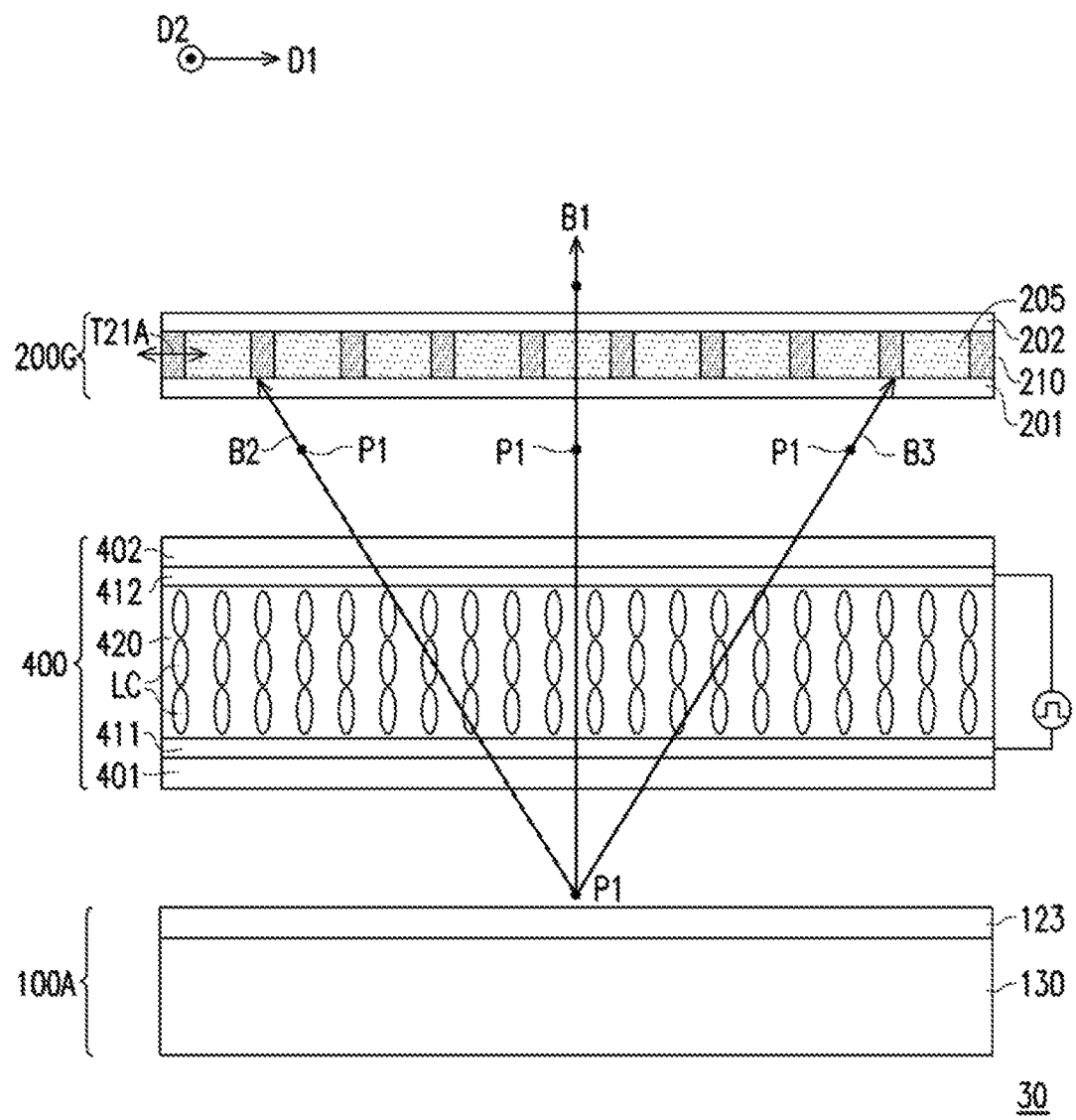

FIG. 13A and FIG. 13B are schematic cross-sectional views showing a display apparatus according to a seventh embodiment of the disclosure in different operation modes. Referring to FIG. 13A, the main difference between a display apparatus 30 of this embodiment and the display apparatus 21 of FIG. 11A lies in that the composition of the display apparatus is different. Specifically, a display panel 100A of the display apparatus 30 is, for example, an organic light emitting diode (OLED) panel, a micro light emitting diode (micro LED) panel, a mini light emitting diode (mini LED) panel, or another self-luminous display panel.

For example, the display panel 100A may include a pixel structure layer 130 and a circular polarizer 123. The pixel structure layer 130 may be activated to emit a plurality of beams (e.g., the beam B1, the beam B2, and the beam B3). The beams emitted by the pixel structure layer 130 are circularly polarized light, and after passing through the circular polarizer 123, the beams have the first linear polarization P1 and are transmitted to the electrically controlled viewing angle switch device 400. The circular polarizer 123 is composed of, for example, a linear polarizer (not shown) and a quarter wave plate (not shown) and can convert the circularly polarized beam emitted by the pixel structure layer 130 into a linearly polarized state.

Two operation modes of the display apparatus 30 are similar to those of the display apparatus 21 of FIG. 11A and FIG. 11B. First, when the display apparatus 30 is operated in the share mode, no potential difference is present between the first electrode layer 411 and the second electrode layer 412 of the electrically controlled viewing angle switch device 400. In the case where the electrically controlled viewing angle switch device 400 is disabled, due to the arrangement of the liquid crystal molecules LC, the polarization state of the polarized light is changed as the beam passes through the liquid crystal layer 420 (e.g., changing from the direction of the second linear polarization P2 to the direction of the first linear polarization P1, or changing from the direction of the first linear polarization P1 to the direction of the second linear polarization P2). At this time, the plurality of beams exiting the display panel 100A (e.g., the beam B1, the beam B2, and the beam B3) all have the first linear polarization P1. After passing through the electrically controlled viewing angle switch device 400, the polarization states of the beams can be converted from the first linear polarization P1 to the second linear polarization P2, and the direction of the second linear polarization P2 is parallel to the transmission axis T21A of the first polarizing portion 210 of the viewing angle control device 200G. Therefore, the beams can all directly pass through the viewing angle control device 200G to be perceived by the human eye.

Referring to FIG. 13B, when the display apparatus 30 is operated in the anti-peeping mode, the first electrode layer 411 and the second electrode layer 412 of the electrically controlled viewing angle switch device 400 are enabled and have different potentials, and the electric field formed by the potential difference between the two electrode layers can drive the liquid crystal molecules LC of the liquid crystal layer 420 to rotate. For example, when the voltage between the two electrode layers is set at the maximum operating voltage, the phase retardation generated by the liquid crystal layer 420 for the beams B1 to B3 is smaller, so the polarization states of the beams B1 to B3 (i.e., the first linear polarization P1) are not changed substantially. Since the polarization direction of the first linear polarization P1 is perpendicular to the transmission axis T21A of the first polarizing portion 210, the beam B2 and the beam B3 cannot pass through the viewing angle control device 200G. The beam B1 does not pass through the first polarizing portion 210 on its transmission path, so the beam B1 can directly pass through the viewing angle control device 200G. Accordingly, the display apparatus 30 can provide a double-side anti-peeping function.

In summary of the above, in the viewing angle control device according to an embodiment of the disclosure, through the alternating arrangement of the polarizing portion and the transmissive portion, and an aspect ratio greater than 1 of the polarizing portion, the polarizability of light at a large viewing angle can be increased, and the light energy loss after the light passes through the viewing angle control device can be effectively reduced. In addition, in the display apparatus according to an embodiment of the disclosure, by configuring the transmission axis of the polarizer provided between the display panel and the viewing angle control device of the above embodiment to be perpendicular to the transmission axis of the polarizing portion of the viewing angle control device, the display apparatus can have a filter effect at a large viewing angle, and the overall brightness of the light at other viewing angles after exiting the display apparatus can be enhanced.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A viewing angle control device comprising a plurality of first polarizing portions and a plurality of transmissive portions, wherein
the plurality of first polarizing portions are arranged along a first direction and extend in a second direction, wherein the viewing angle control device has a light entrance surface and a light exit surface, the light entrance surface and the light exit surface are located at opposite sides of the viewing angle control device, the light entrance surface is parallel to the first direction and the second direction, a plurality of light beams enter the viewing angle control device through the light entrance surface and exit the viewing angle control device through the light exit surface, a beam of the plurality of light beams is linearly polarized after passing through at least one of the plurality of the first polarizing portions, at least two of the plurality of light beams are linearly polarized after exiting from the light exit surface of the viewing angle control device, at least one of the plurality of light beams is still in its original polarization state after passing through corresponding one of the plurality of transmissive portions of the viewing angle control device and exiting from the light exit surface of the viewing angle control device, a difference in a refractive index between the first polarizing portion and the transmissive portion in a wavelength range of 400 nm to 700 nm is less than 0.3, and
the plurality of transmissive portions and the plurality of first polarizing portions are alternately arranged, wherein each of the first polarizing portions has a width in the first direction and a height in a direction perpendicular to the first direction and the second direction, and a ratio of the height to the width of each of the first polarizing portions is greater than 1.

2. The viewing angle control device according to claim 1, further comprising:
a plurality of second polarizing portions, wherein the plurality of second polarizing portions and the plurality of transmissive portions are alternately arranged along the second direction, and the plurality of second polarizing portions extend in the first direction.

3. The viewing angle control device according to claim 2, wherein the plurality of first polarizing portions have a first transmission axis, the plurality of second polarizing portions have a second transmission axis, and the first transmission axis is parallel to the second transmission axis.

4. The viewing angle control device according to claim 1, wherein the viewing angle control device has a light entrance surface, each of the first polarizing portions has a plurality of polarizing patterns, and orthographic projections of the plurality of polarizing patterns on the light entrance surface overlap each other.

5. The viewing angle control device according to claim 4, wherein areas of the orthographic projections of the plurality of polarizing patterns on the light entrance surface gradually increase or gradually decrease in a direction away from the light entrance surface.

6. The viewing angle control device according to claim 1, wherein the viewing angle control device has a light entrance surface, wherein the plurality of first polarizing portions have a first surface and a second surface which are not covered by the plurality of transmissive portions, and orthographic projections of the first surface and the second surface, which are opposite to each other, on the light entrance surface do not completely overlap each other.

7. A display apparatus comprising a viewing angle control device and a display panel, wherein
the viewing angle control device comprises a plurality of first polarizing portions and a plurality of transmissive portions, wherein
the plurality of first polarizing portions are arranged along a first direction and extend in a second direction, the viewing angle control device has a light entrance surface and a light exit surface, the light entrance surface and the light exit surface are located at opposite sides of the viewing angle control device, the light entrance surface is parallel to the first direction and the second direction, a plurality of light beams enter the viewing angle control device through the light entrance surface and exit the viewing angle control device through the light exit surface, and
the plurality of transmissive portions and the plurality of first polarizing portions are alternately arranged, wherein each of the first polarizing portions has a width in the first direction and a height in a direction perpendicular to the first direction and the second direction, and a ratio of the height to the width of each of the first polarizing portions is greater than 1, and the display panel overlaps the viewing angle control device, and the display panel is provided with a polarizer on one side facing the viewing angle control device, wherein the plurality of first polarizing portions have a first transmission axis, a beam of the plurality of light beams is linearly polarized after passing through at least one of the plurality of the first polarizing portions, at least two of the plurality of light beams are linearly polarized after exiting from the light exit surface of the viewing angle control device, at least one of the plurality of light beams is still in its original polarization state after passing through corresponding one of the plurality of transmissive portions of the viewing angle control device and exiting from the light exit surface of the viewing angle control device, a difference in a refractive index between the first polarizing portion and the transmissive portion in a wavelength range of 400 nm to 700 nm is less than 0.3, the polarizer has a second transmission axis, and the first transmission axis is perpendicular to the second transmission axis.

8. The display apparatus according to claim 7, further comprising:

an electrically controlled viewing angle switch device overlapping the viewing angle control device and located between the display panel and the viewing angle control device, wherein the electrically controlled viewing angle switch device comprises a liquid crystal layer and at least two electrode layers disposed on two opposite sides of the liquid crystal layer or at least one electrode layer disposed on one side of the liquid crystal layer.

9. The display apparatus according to claim 8, wherein the liquid crystal layer comprises a twisted nematic liquid crystal, and an absolute value of a voltage difference between the electrode layers is greater than 0 V and less than a maximum operating voltage difference of the liquid crystal layer.

* * * * *